United States Patent
Kuppelur et al.

(10) Patent No.: US 12,520,226 B2
(45) Date of Patent: Jan. 6, 2026

(54) PAGING COLLISION WITH 5GMM SPECIFIC PROCEDURE OR SERVICE REQUEST PROCEDURE

(71) Applicant: APPLE INC., Cupertino, CA (US)

(72) Inventors: Nitin Kuppelur, Karnataka (IN);
Roland Gruber, Bavaria-Bayern (DE);
Krisztian Kiss, Cupertino, CA (US);
Deepak Dash, Karnataka (IN); Piush Kumar, Karnataka (IN)

(73) Assignee: APPLE INC., Cupertino, CA (US)

( * ) Notice: Subject to any disclaimer, the term of this patent is extended or adjusted under 35 U.S.C. 154(b) by 409 days.

(21) Appl. No.: 18/044,937

(22) PCT Filed: Sep. 3, 2021

(86) PCT No.: PCT/US2021/071361
§ 371 (c)(1),
(2) Date: Mar. 10, 2023

(87) PCT Pub. No.: WO2022/076958
PCT Pub. Date: Apr. 14, 2022

(65) Prior Publication Data
US 2023/0388898 A1 Nov. 30, 2023

(30) Foreign Application Priority Data
Oct. 7, 2020 (IN) .............................. 202041043639

(51) Int. Cl.
*H04W 48/02* (2009.01)
*H04W 48/16* (2009.01)
(Continued)

(52) U.S. Cl.
CPC ........... *H04W 48/02* (2013.01); *H04W 48/16* (2013.01); *H04W 68/005* (2013.01); *H04W 76/18* (2018.02); *H04W 88/06* (2013.01)

(58) Field of Classification Search
CPC ........................... H04W 48/02; H04W 68/005
See application file for complete search history.

(56) References Cited

U.S. PATENT DOCUMENTS 12,133,295 B2 * 10/2024 Venkataraman ...... H04W 76/28
2016/0212782 A1 7/2016 Ko et al.
(Continued)

FOREIGN PATENT DOCUMENTS

| EP | 3525546 A1 | 8/2019 |
| WO | 2020071536 A1 | 4/2020 |
| WO | 2020102587 A1 | 5/2020 |

OTHER PUBLICATIONS

ETSI TS 124 501, "5G; Non-Access-Stratum (NAS) protocol for 5G System (5GS); Stage 3", version 15.0.0 Release 15, Jul. 1, 2018 337 pages.
(Continued)

*Primary Examiner* — Diane D Mizrahi
(74) *Attorney, Agent, or Firm* — Dorsey & Whitney LLP

(57) ABSTRACT

If a paging or notification message is received by a user equipment (UE) when a UE-initiated 5GMM specific procedure or service request procedure is ongoing, a UE may buffer the paging or notification message. To buffer the paging or notification message, the UE may remember the pending mobile terminated transaction and re-attempt the registration or request procedure with the access category 0 (=MT_acc), if the ongoing UE-initiated 5GMM specific procedure or service request procedure fails due to access barring. If a 5GMM specific procedure or service request procedure is received by the network when a MT transaction is ongoing (i.e. a paging message with the access type set to 3GPP access or notification message via non-3GPP access with the access type indicating 3GPP access) the network may complete the incoming MT transaction and may
(Continued)

remember the pending mobile terminated transaction and continue it once the MO transaction is completed.

20 Claims, 13 Drawing Sheets

(51) Int. Cl.
    *H04W 68/00*     (2009.01)
    *H04W 76/18*     (2018.01)
    *H04W 88/06*     (2009.01)

(56) References Cited

U.S. PATENT DOCUMENTS

| | | |
|---|---|---|
| 2018/0035399 A1 | 2/2018 | Xu et al. |
| 2019/0028917 A1 | 1/2019 | Alnås et al. |
| 2019/0342821 A1 | 11/2019 | Kim et al. |

OTHER PUBLICATIONS

PCT/US2021/071361, International Search Report and Written Opinion, Nov. 22, 2021, 12 pages.
ETSI TS 123 502 "5G; Procedures for the 5G System (5GS) (3GPP TS 23.502 version 15.6.0 Release 15)", V15.6.0, Oct. 2019, 362 pages.

\* cited by examiner

PAGING COLLISION WITH 5GMM SPECIFIC PROCEDURE OR SERVICE REQUEST PROCEDURE

TECHNICAL FIELD

This application relates generally to wireless communication systems, including handling paging and notifications when a 5GMM specific procedure or service request procedure is ongoing.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicates with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
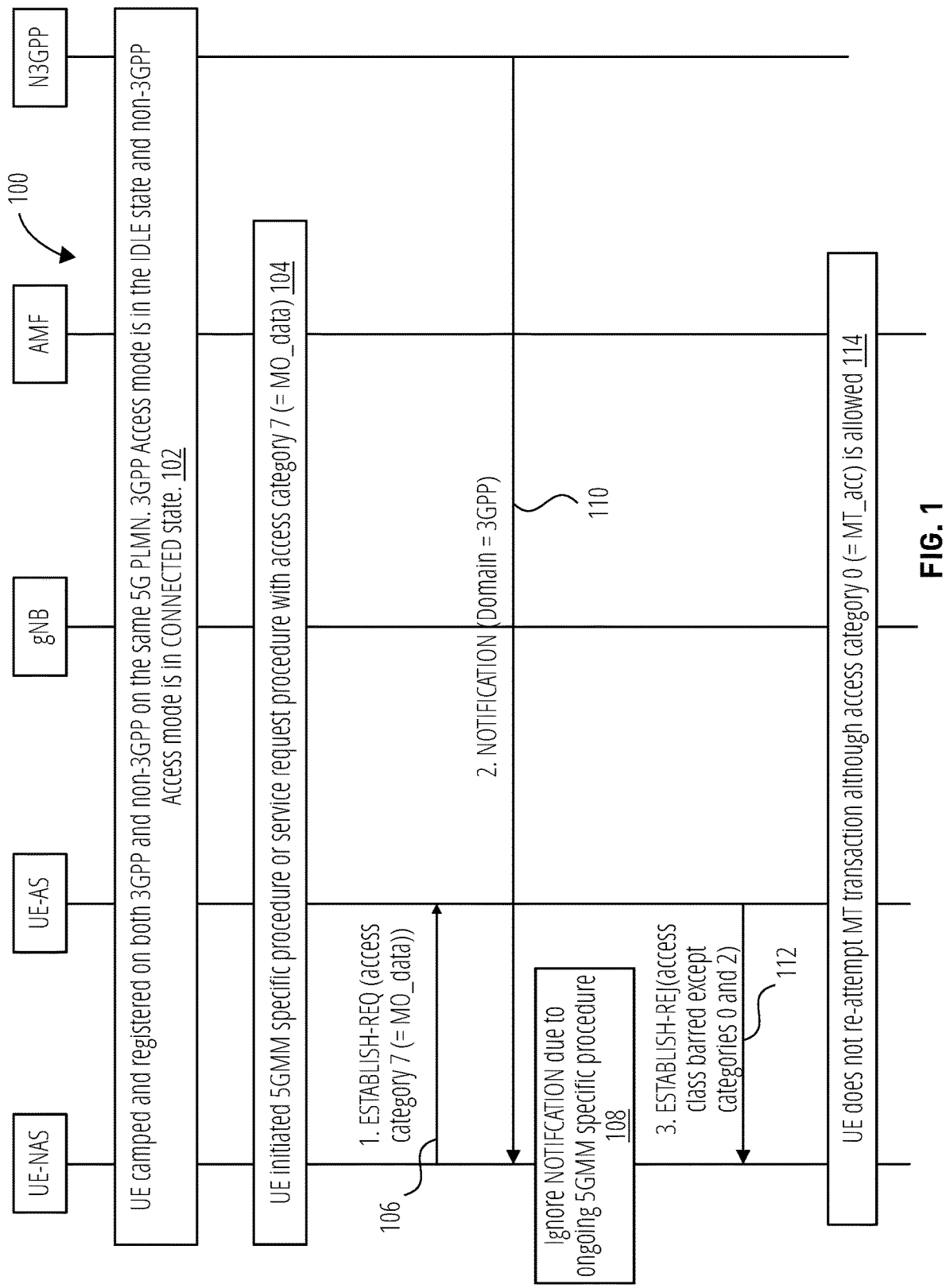
FIG. 1 is a simplified signal flow diagram of a scenario in which a notification procedure is ignored when parallel 3GPP MO data SERVICE REQUEST/REGISTRATION REQUEST procedure fails.

One goal in network communications is to provide reliable service with few or no missed notifications or pagings for mobile terminated (MT) transactions. It is critical for a UE to correctly handle network transactions to create a reliable experience. For example, if a user equipment (UE) has an incoming call, it is expected that the network will properly deliver the call to the UE.

However, currently there are several scenarios where a transaction, such as an incoming call, may fail due to conflicting conditions. Three scenarios are outlined herein that may cause such transaction failure. These failures may occur as a result of a paging for fifth generation system (5GS) services or a notification being missed due to a UE initiated fifth generation mobility management (5GMM) specific procedure or service request procedure while the network is experiencing a high load or congestion. The collision between the paging or notification and the 5GMM specific procedure or service request procedure may result in a failed or missed mobile terminated (MT) transaction.

Embodiments herein describe systems, apparatuses, and methods for correcting these transaction failures. In some embodiments, the UE may buffer the paging message or the notification message until the ongoing 5GMM specific procedure or service request procedure is complete. If the 5GMM specific procedure or service request procedure succeeds, the UE may ignore the paging message or the notification message. If the 5GMM specific procedure or service request procedure fails, the UE may initiate a 5GMM specific procedure or service request procedure to handle the paging message or the notification message. In some embodiments, the network node may proceed with a registration request or a service request whenever a paging procedure is initiated or a notification message has been transmitted to the UE.

5GMM specific procedures may be: 1) Initiated by the UE and used e.g. to register to the network for 5GS services and establish a 5GMM context, to update the location/parameter (s) of the UE: registration. 2) Initiated by the UE or the network and used to deregister from the network for 5GS services and to release a 5GMM context: de-registration. 3) Initiated by the UE and used to deregister from the network for 5GS services and to release a 5GMM context: eCall inactivity procedure. A service request procedure may be used by a UE to request the establishment of a secure connection to an AMF. The Service Request procedure may also be used to activate a User Plane connection for an established PDU Session.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a simplified signal flow diagram 100 of a scenario in which a notification procedure via non3GPP access fails. The notification procedure may be used by the network to request the UE, by sending the NOTIFICATION message over non-3GPP access, to re-establish user-plane resources of the Packet Data Unit (PDU) session(s) or to deliver downlink signaling associated with 3GPP access over 3GPP access. Shown in this signal flow diagram 100 is a UE non access stratum (NAS), a UE Access stratum (AS), a network node (e.g., gNB), Access and Mobility Management Function (AMF), and a non-3GPP (N3GPP) access network (e.g., Wi-Fi).

In this scenario, the UE is camped and registered 102 on both 3GPP and non-3GPP on the same 5G Public Land Mobile Network (PLMN). Further, in this scenario 3GPP Access mode is in the IDLE state and non-3GPP Access mode is in CONNECTED state.

As shown, the UE starts a UE initiated 5GMM specific procedure or service request procedure with access category 7 (=MO_data) 104. While the illustrated embodiment shows that the 5GMM specific procedure or service request procedure has an access category of 7 (=MO_data), the failure explained with reference to this figure may occur for any UE initiated 5GMM specific procedure or service request procedure on 3GPP Access in Idle mode with access category other than 0 and 2. As part of the UE initiated 5GMM specific procedure or service request procedure, the UE-NAS sends 106 an establish request message to the UE-AS.

The network may initiate a notification procedure by sending the NOTIFICATION message 110 to the UE. As shown, in some instances this may result in a conflicting state when the UE initiated 5GMM specific procedure or service request procedure is still pending and the notification is received by the UE. As shown, in this scenario before the UE moves to CONNECTED state on the 3GPP domain, the UE receives the NOTIFICATION with access type=3GPP in non-3GPP Access.

According to the current method of handling such a conflict, the UE ignores 108 the NOTIFICATION due to the ongoing 5GMM specific procedure or service request procedure. If a PAGING on 3GPP access or a NOTIFICATION message is received via non-3GPP access with access type indicating 3GPP access while a 5GMM specific procedure or service request procedure over 3GPP access is ongoing (which is considered as Mobile Originated (MO) activity in terms of Access Barring), the UE currently ignores the PAGING or NOTIFICATION message as the response to the PAGING or NOTIFICATION would result in the same already ongoing procedure.

However, this approach may cause the NOTIFICATION request to fail. For example, as shown, during the connection establishment for 5GMM specific procedure, lower layers may indicate that access barring is applicable for all access categories except categories 0 and 2. The access class barring may occur due to high load or congestion on the network. UE-AS may send a rejection message 112 due to this access class barring. If during the connection establishment for the MO 5GMM specific procedure or service request procedure the lower layers indicate that access barring is applicable for all access categories except categories 0 and 2 and the access category with which the access attempt was associated is other than access category 0 (=MT_acc) and 2, UE aborts the ongoing 5GMM specific procedure or service request procedure.

The UE also currently does not re-trigger the ongoing 5GMM specific procedure till the lower layers indicate that the barring is alleviated for the access category with which the access attempt was associated.

Further, the UE will not re-attempt 114 the mobile terminated transaction (e.g., the notification or paging) although access category 0 (MT access) and 2 (Emergency access) are allowed, which results in MT transaction failure. In consequence, the UE will not react to the MT PAGING or NOTIFICATION (i.e. an incoming call) even though the MT transaction associated with the NOTIFICATION message 110 may be not barred (e.g., an MT call access is not barred). This will result in failure of mobile terminated high priority activity triggered in PAGING or NOTIFICATION, even if the activity would pass access barring (e.g., access category 0 (MT access)). Thus, the NOTIFICATION message 110 is missed due to the 5GMM specific procedure being barred.

Figure 2:
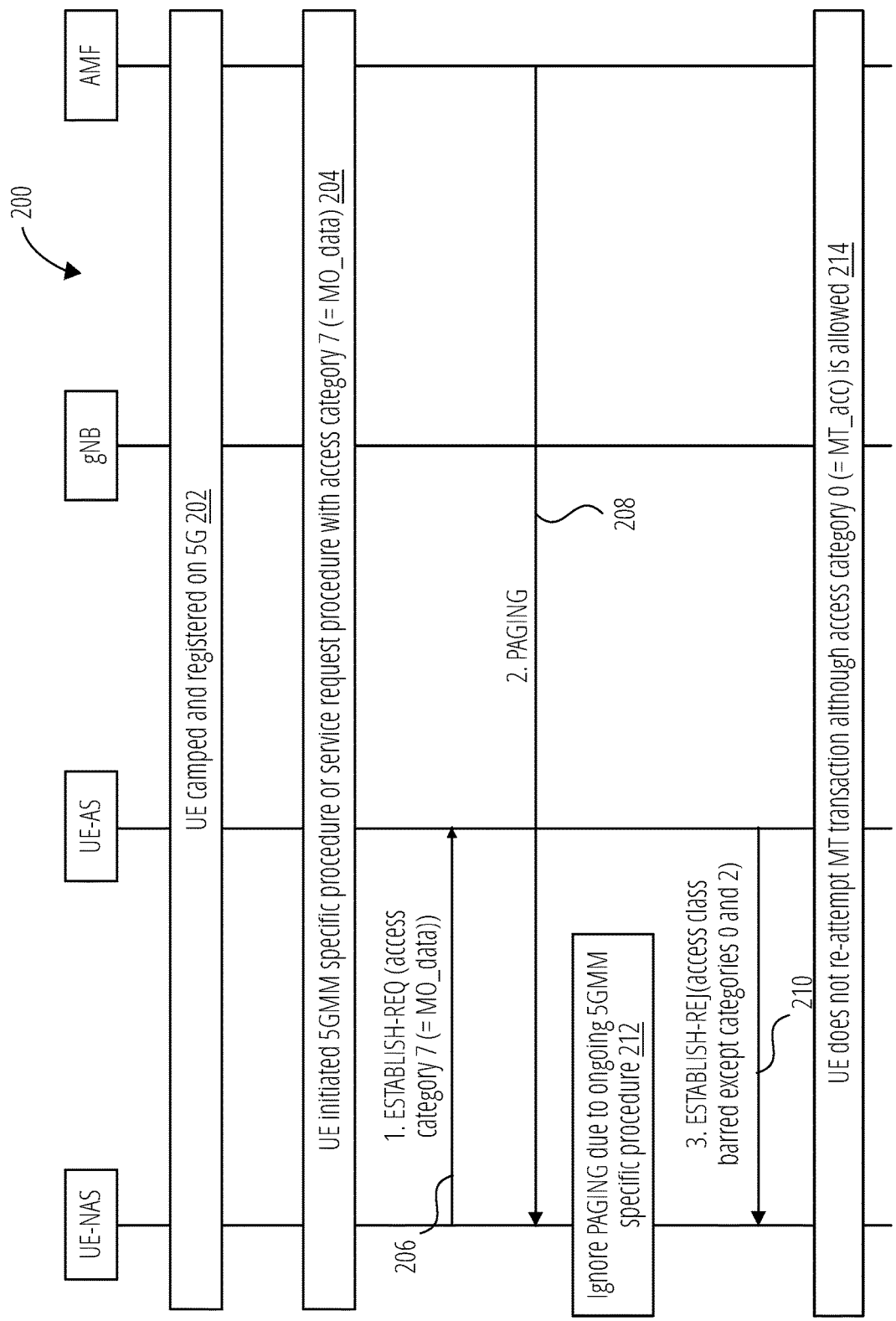
FIG. 2 is a simplified signal flow diagram of a scenario in which a paging procedure is ignored when parallel 3GPP MO data SERVICE REQUEST/REGISTRATION REQUEST procedure fails.

FIG. 2 is a simplified signal flow diagram 200 of a scenario in which a paging procedure fails. A failure may occur if PAGING on 3GPP access is received when 5GMM specific procedure or service request procedure over 3GPP access is ongoing. Shown in this signal flow diagram 200 is a UE-NAS, a UE-AS, a gNB, and an AMF. In this scenario, the UE is camped and registered 202 on 5G PLMN and is in IDLE state.

As shown, the UE starts a UE initiated 5GMM specific procedure or service request procedure with access category 7 (=MO_data) 204. While the illustrated embodiment shows that the 5GMM specific procedure or service request procedure has an access category of 7 (=MO_data), the failure explained with reference to this figure may occur for any UE initiated 5GMM specific procedure or service request procedure on 3GPP Access in Idle mode with access category other than 0 and 2. As part of the UE initiated 5GMM specific procedure or service request procedure, the UE-NAS sends 206 an establish request message to the UE-AS.

The network may initiate a paging procedure 208 by sending the PAGING message to the UE. As shown, in some instances this may result in a conflicting state when the UE initiated 5GMM specific procedure or service request procedure is still pending and the PAGING message is received by the UE. As shown, in this scenario before the UE moves to a CONNECTED state on the 3GPP domain, due to a race condition UE receives PAGING message.

According to the current method of handling such a conflict, the UE ignores 212 the paging as the UE is expected to move to a CONNECTED state due to the ongoing 5GMM specific procedure or service request procedure. However, this approach may cause the PAGING to be missed. For example, as shown, during the connection establishment for 5GMM specific procedure, lower layers may indicate that access barring is applicable for all access categories except categories 0 and 2. The access class barring may occur due to high load or congestion on the network. UE-AS may send a rejection message 210 due to this access class barring. If during the connection establishment for the MO 5GMM specific procedure or service request procedure the lower layers indicate that access barring is applicable for all access categories except categories 0 and 2 and the access category with which the access attempt was associated is other than access category 0 (=MT_acc) and 2, UE aborts the ongoing 5GMM specific procedure or service request procedure.

The UE will not re-attempt 214 the mobile terminated transaction (e.g., a transaction associated with the PAGING although access category 0 (MT access) and 2 (Emergency access) are allowed, which results in MT transaction failure. In consequence, the UE will not react to the MT PAGING (i.e. an incoming call) even though the MT transaction associated with the MT PAGING (i.e., the paging procedure 208) may be not barred (e.g., an MT call access is not barred). This will result in failure of mobile terminated high priority activity triggered in PAGING, even if the activity would pass access barring (e.g., access category 0 (MT access)). Accordingly, the PAGING message is missed due to the 5GMM specific procedure being barred. Thereby leading to an MT transaction failure.

Figure 3:
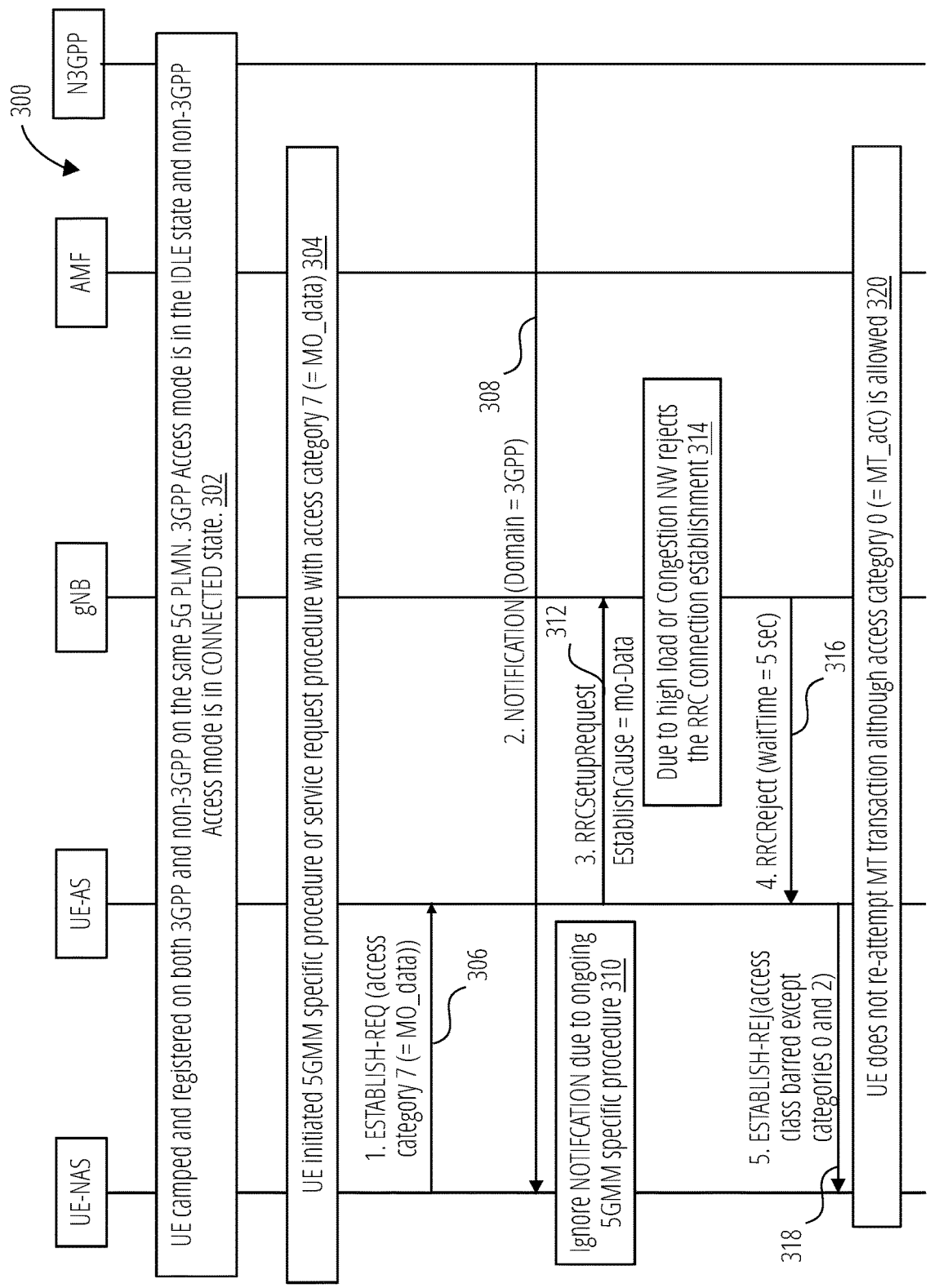
FIG. 3 is a simplified signal flow diagram of a scenario in which an MT transaction (e.g., NOTIFICATION (Domain=3GPP)) is missed due to congestion at the gNB.

FIG. 3 is a simplified signal flow diagram 300 of a scenario in which an MT transaction (e.g., NOTIFICATION (Domain=3GPP)) is missed due to congestion at the gNB. In this scenario, a NOTIFICATION is missed similar to FIG. 1. In this case, no access barring occurred. Instead, the gNB rejects the connection request due to high load or congestion. Shown in this signal flow diagram 300 is a UE-NAS, a UE-AS, a gNB, an AMF, and a N3GPP. While the illustrated embodiment shows a notification message, a similar failure may occur when a paging message is sent.

In this scenario, the UE is camped and registered 302 on both 3GPP and non-3GPP on the same 5G Public Land Mobile Network (PLMN). Further, in this scenario, 3GPP Access mode is in the IDLE state and non-3GPP Access mode is in CONNECTED state.

As shown, the UE may start a UE initiated 5GMM specific procedure or service request procedure with access category 7 (=MO_data) 304. While the illustrated embodiment shows that the 5GMM specific procedure or service request procedure has an access category of 7 (=MO_data), the failure explained with reference to this figure may occur for any UE initiated 5GMM specific procedure or service request procedure on 3GPP Access in Idle mode with access category other than 0 and 2. As part of the UE initiated 5GMM specific procedure or service request procedure, the UE-NAS sends 306 an establish request message to the UE-AS.

The network may initiate a notification procedure 308 by sending the NOTIFICATION message to the UE. As shown, in some instances this may result in a conflicting state when the UE initiated 5GMM specific procedure or service request procedure is still pending and the notification is received by the UE. As shown, in this scenario, before the UE moves to CONNECTED state on the 3GPP domain, the UE receives the NOTIFICATION with access type=3GPP in non-3GPP Access.

According to the current method of handling such a conflict, the UE ignores 310 the NOTIFICATION due to the ongoing 5GMM specific procedure or service request procedure. According to current methods, if a PAGING on 3GPP access or a NOTIFICATION message is received via non-3GPP access with access type indicating 3GPP access while a 5GMM specific procedure or service request procedure over 3GPP access is ongoing (which is considered as Mobile Originated (MO) activity in terms of Access Barring), the UE currently ignores the PAGING or NOTIFICATION message as the response to the PAGING or NOTIFICATION would result in the same already ongoing procedure.

This approach may cause the NOTIFICATION request to fail. For example, the UE may continue connection establishment with access category which is not category 0 (=MT_acc) transmitting an RRC setup request 312. Instead of an MT access category, the illustrated embodiment is sending a mobile data request. However, the network is expecting that the UE will initiate 5GMM specific procedure or service request procedure with access category 0 (=MT_acc) due to the NOTIFICATION, so that the processing for the MT transaction can be prioritized. The network does not realize that the NOTIFICATION has been ignored.

If the gNB is experiencing high load or congestion, the network may reject 314 the RRC connection establishment because the access category of the request is not category 0 (=MT_acc). Additionally, the UE will not reattempt the mobile terminated transaction although access category 0 (MT access) and 2 (Emergency access) are allowed, which results in an MT transaction failure.

While the illustrated embodiment specifies a NOTIFICATION procedure, a similar failure may occur for a paging procedure. If the network has started the Paging procedure and receives a REGISTRATION REQUEST message, high load or congestion may cause the network to reject the REGISTRATION REQUEST, thereby causing an ignored paging procedure to fail.

Figure 4:
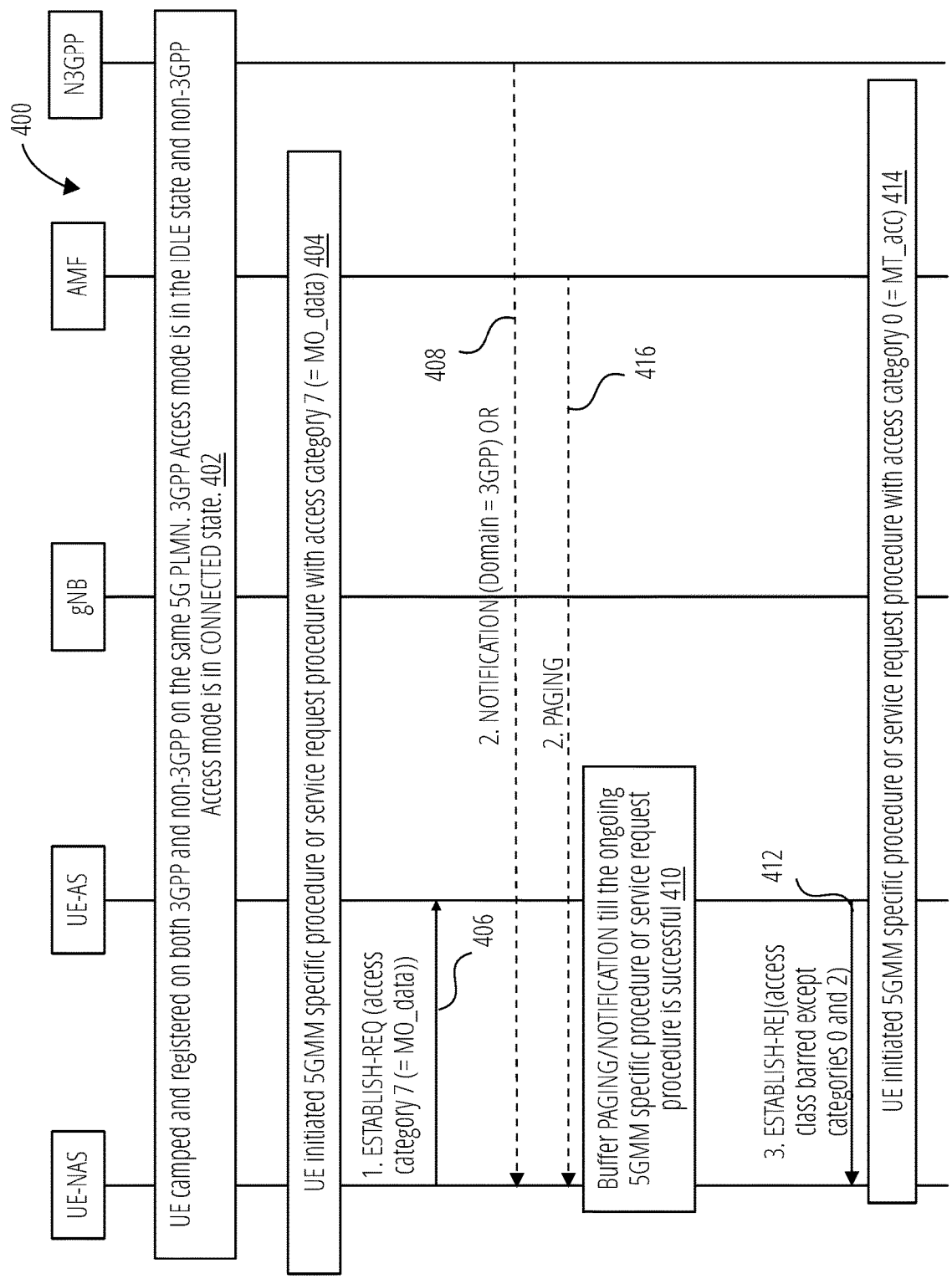
FIG. 4 illustrates a signal flow diagram for a method to prevent the MT transaction failures described with reference to FIGS. 1 and 2 in accordance with one embodiment.

FIG. 4 illustrates a signal flow diagram 400 for a method to prevent the MT transaction failures described with reference to FIGS. 1 and 2. The signal flow diagram 400 prevents notification and paging messages from being missed due to access barring and a collision condition with a UE initiated 5GMM specific procedure or service request procedure. Shown in this signal flow diagram 400 is a UE-NAS, a UE-AS, a gNB, an AMF, and a N3GPP.

In the illustrated embodiment, the UE is camped and registered 402 on both 3GPP and non-3GPP on the same 5G PLMN. Further, 3GPP Access mode is in the IDLE state and non-3GPP Access mode is in CONNECTED state. While paging may occur when the UE is camped and registered 402 on 5G PLMN and is in IDLE state without the non- 3GPP, for conciseness, both the notification and paging procedures are discussed with reference to FIG. 4.

As shown, the UE may start a UE initiated 5GMM specific procedure or service request procedure with e.g., access category 7 (=MO_data) 404. While the illustrated embodiment shows that the 5GMM specific procedure or service request procedure has an access category of 7 (=MO_data), the method explained with reference to this figure may occur for any UE initiated 5GMM specific procedure or service request procedure on 3GPP Access in Idle mode with access category other than 0 and 2. As part of the UE initiated 5GMM specific procedure or service request procedure, the UE-NAS sends 406 an establish request message to the UE-AS.

The following discussion covers both the case of the UE receiving a notification message 408 or a paging message 416. While both types of messages are discussed, it is likely only one of these messages would be received while the 5GMM specific procedure or service request procedure is ongoing. Thus, the notification message 408 and the paging message are shown with a dotted line and both labeled as the second signal of the signal flow diagram 400.

The network may initiate a notification procedure by sending the notification message 408 to the UE. As shown, in some instances this may result in a conflicting state when the UE initiated 5GMM specific procedure or service request procedure is still pending and the notification is received by the UE. As shown, in this situation before the UE moves to CONNECTED state on the 3GPP domain, the UE receives the notification message 408 with access type=3GPP in non-3GPP Access.

Similarly, the network may initiate a paging procedure by sending the PAGING message 416 to the UE. As shown, in some instances this may result in a conflicting state when the UE initiated 5GMM specific procedure or service request procedure is still pending and the paging message 416 is received by the UE. As shown, in this scenario before the UE moves to a CONNECTED state on the 3GPP domain, due to a race condition the UE receives paging message 416.

Unlike FIGS. 1 and 2, in this signal flow diagram 400 if the paging message 416 on 3GPP access is received or the notification message 408 is received via non-3GPP access with access type indicating 3GPP access when UE-initiated 5GMM specific procedure or service request procedure over 3GPP access is ongoing, UE remembers the pending mobile terminated transaction and it acts on the pending MT transaction with the access category 0 (=MT_acc), if the ongoing UE-initiated 5GMM specific procedure or service request procedure over 3GPP access fails because it indicates that the access attempt is barred for all access categories except categories 0 and 2.

For example, as shown, the UE buffers 410 the PAGING/NOTIFICATION till the ongoing 5GMM specific procedure or service request procedure is successful or fails. If the 5GMM specific procedure or service request procedure is successful, then the UE may simply ignore the paging message 416 or notification message as the connection will have been established. However, the 5GMM specific procedure or service request procedure may fail. For example, during the connection establishment for 5GMM specific procedure, lower layers may indicate that access barring is applicable for all access categories except categories 0 and 2. The access class barring may occur due to high load or congestion on the network. UE-AS may send a rejection message 412 due to this access class barring.

As the paging message 416 or notification message 408 has been buffered, the UE may remember the MT transaction and initiate 414 a 5GMM specific procedure or service request procedure with access category 0 (=MT_acc). As the access category is set to 0 (=MT_acc), the access class barring will not prevent this second 5GMM specific procedure or service request procedure from proceeding.

For example, this abnormal case may occur when a paging message 416 is received with access type set to 3GPP access when the UE-initiated 5GMM specific procedure or service request procedure is ongoing. The UE may proceed with the 5GMM specific procedure or service request procedure. If lower layers indicate that the access attempt is barred, then the UE may handle the pending paging message 416. Otherwise, the UE may ignore the paging once lower layers confirm the establishment of the signaling connection is successful.

Similarly, another abnormal case may occur if the notification message 408 is received via non-3GPP access with access type indicating 3GPP access when UE-initiated 5GMM specific procedure or service request procedure over 3GPP access is ongoing. The UE may proceed with 5GMM specific procedure or service request procedure. If for these procedures lower layers indicate that the access attempt is barred, then the UE shall handle the pending notification message 408. Otherwise the UE shall ignore the notification message 408 once lower layers confirm the establishment of the signaling connection is successful.

In other words, if the 5GMM procedure which was not started with access category 0 (=MT_acc) fails due to lower layers indication that access barring is applicable for all access categories except categories 0 and 2 and if UE has buffered PAGING or NOTIFICATION message, the UE shall re-attempt the REGISTRATION- or SERVICE-REQUEST procedure with the access category 0 (=MT_acc).

Figure 5:
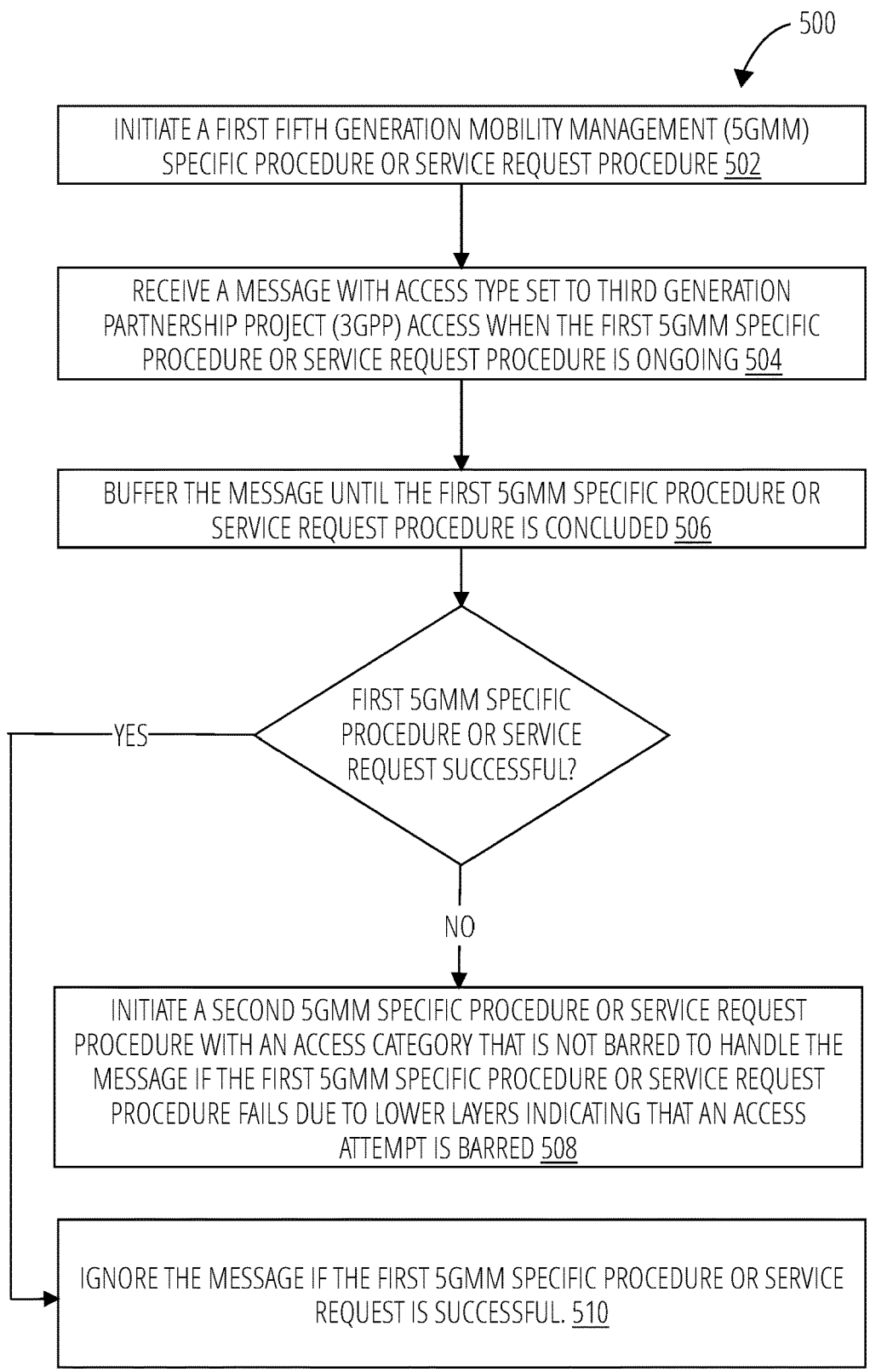
FIG. 5 illustrates a flow diagram of a method for a UE to perform buffering of a paging or notification message while a 5GMM specific procedure is occurring in accordance with one embodiment.

FIG. 5 illustrates a flow diagram of a method 500 for a UE to perform buffering of a paging or notification message while a 5GMM specific procedure is occurring. In block 502, method 500 initiates a first fifth generation mobility management (5GMM) specific procedure or service request procedure. In block 504, method 500 receives a message with access type set to third generation partnership project (3GPP) access when the first 5GMM specific procedure or service request procedure is ongoing. In block 506, method 500 buffers the message until the first 5GMM specific procedure or service request procedure is concluded. In block 508, method 500 initiates a second 5GMM specific procedure or service request procedure with an access category that is not barred to handle the message if the first 5GMM specific procedure or service request procedure fails due to lower layers indicating that an access attempt is barred. In block 510, method 500 ignores the message if the first 5GMM specific procedure or service request is successful.

Figure 6:
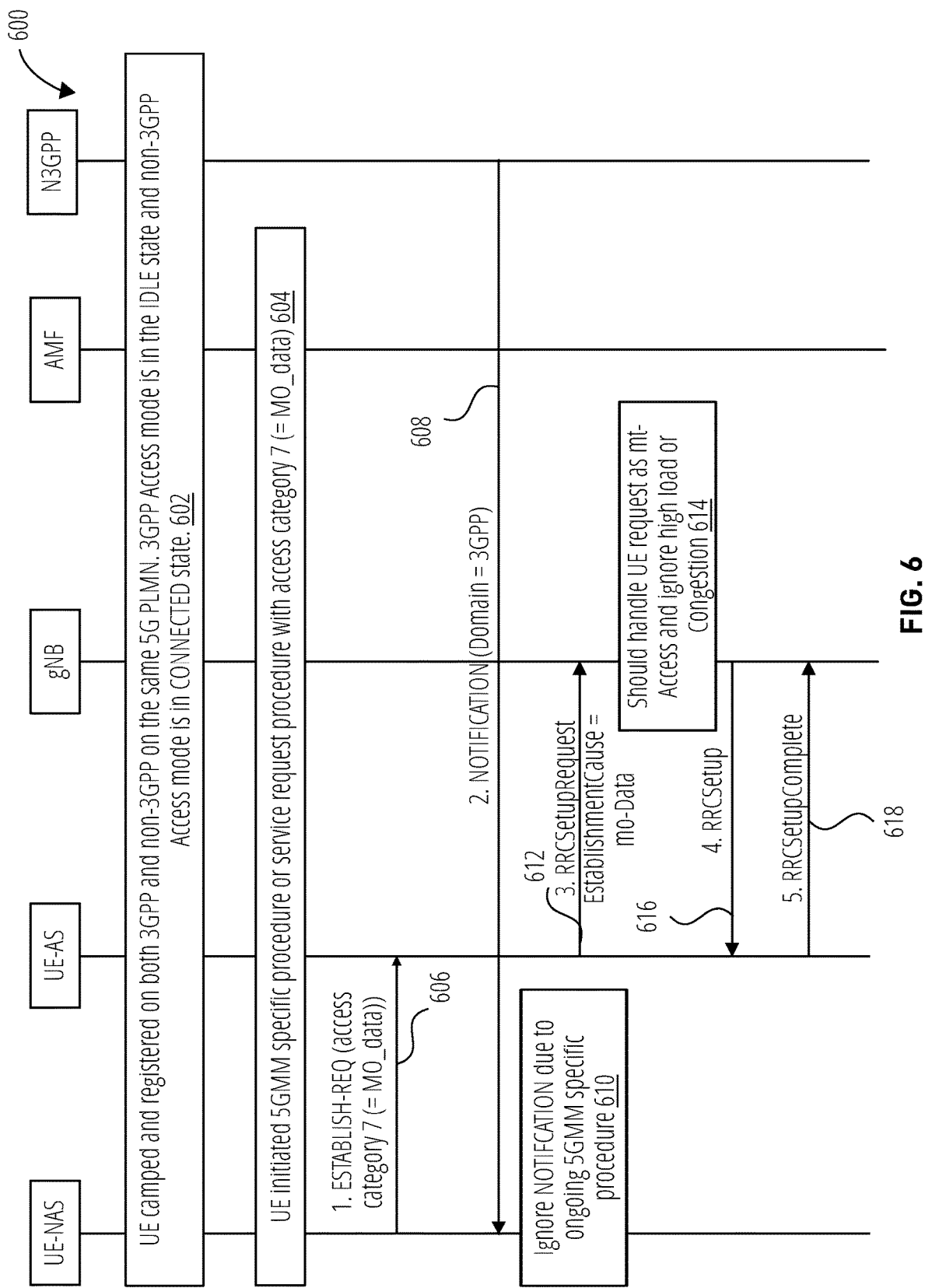
FIG. 6 illustrates a signal flow diagram for a method to prevent the MT transaction failures described with reference to FIG. 3 in accordance with one embodiment.

FIG. 6 illustrates a signal flow diagram 600 for a method to prevent the MT transaction failures described with reference to FIG. 3. In this case no access barring occurred. Instead, the gNB rejects the connection request due to high load or congestion. Shown in this signal flow diagram 600 is a UE-NAS, a UE-AS, a gNB, an AMF, and a N3GPP. While the illustrated embodiment shows a notification message, a similar failure may occur when a paging message is sent.

In this scenario, the UE is camped and registered 602 on both 3GPP and non-3GPP on the same 5G Public Land Mobile Network (PLMN). Further, in this scenario 3GPP Access mode is in the IDLE state and non-3GPP Access mode is in CONNECTED state.

As shown, the UE may start a UE initiated 5GMM specific procedure or service request procedure with access category 7 (=MO_data) 604. While the illustrated embodiment shows that the 5GMM specific procedure or service request procedure has an access category of 7 (=MO_data), the method explained with reference to this figure may occur for any UE initiated 5GMM specific procedure or service request procedure on 3GPP Access in Idle mode with access category other than 0 and 2. As part of the UE initiated 5GMM specific procedure or service request procedure, the UE-NAS sends 606 an establish request message to the UE-AS.

The network may initiate a notification procedure by sending the NOTIFICATION message 608 to the UE. As shown, in some instances this may result in a conflicting state when the UE initiated 5GMM specific procedure or service request procedure is still pending and the notification is received by the UE. As shown, in this scenario before the UE moves to CONNECTED state on the 3GPP domain, the UE receives the NOTIFICATION with access type=3GPP in non-3GPP Access.

The UE may ignore 610 the NOTIFICATION due to the ongoing 5GMM specific procedure or service request procedure and no access barring. The UE may continue connection establishment with access category which is not category 0 (=MT_acc) by transmitting an RRC setup request 612.

In this embodiment, the network receives a REGISTRATION REQUEST message while T3565 is running. T3565 is a timer that is started when a notification procedure was initiated indicating a pending MT transaction. In other words, T3565 indicates that the network is waiting for a response to a notification message. In this situation, the network shall proceed with the registration procedure (rather than to ignore it) and upon completion of the registration procedure continues with the pending MT transaction (i.e. it starts the MT call via the established signaling connection). In the illustrated embodiment, the network handles 614 the request by transmitting an RRC setup message 616 and receiving an RRC setup complete message 618.

In other words, if the network has started a MT transaction (i.e. has sent a PAGING or NOTIFICATION message), the network (gNB and AMF) may proceed with a received REGISTRATION-REQUEST or SERVICE-REQUEST triggered with access category which is not for access category 0 (=MT_acc) rather than to ignore it. Upon completion of the registration or service request procedure the network may continue with the pending MT transaction (i.e. it starts the MT transaction via the established signaling connection).

For example, in the abnormal case where a notification message is transmitted and the network receives a REGISTRATION REQUEST message while T3513 is running, the network may proceed with the registration procedure and upon completion of the procedure continues with the pending MT transaction. Similarly, in the abnormal case where a paging message is transmitted and the network receives a REGISTRATION REQUEST message while T3513 is running, the network may proceed with the registration procedure and upon completion of the procedure continues with the pending MT transaction. The T3513 is a timer that is started when a paging procedure was initiated indicating a pending MT transaction. In other words, T3513 indicates that the network is waiting for a response to a PAGING message.

For example, in the abnormal case where a notification message is transmitted and the network receives a REGISTRATION REQUEST or SERVICE REQUEST message while T3565 is running, the network may proceed with the registration procedure and upon completion of the procedure continues with the pending MT transaction. Similarly, in the abnormal case where a paging message is transmitted and the network receives a REGISTRATION REQUEST or SERVICE REQUEST message while T3565 is running, the network may proceed with the registration procedure or service request procedure and upon completion of the procedure, continues with the pending MT transaction. The T3565 is a timer that is started when a notification procedure (with domain=3GPP) was initiated, indicating a pending MT transaction. In other words, T3565 indicates that the network is waiting for a response to a notification message.

Figure 7:
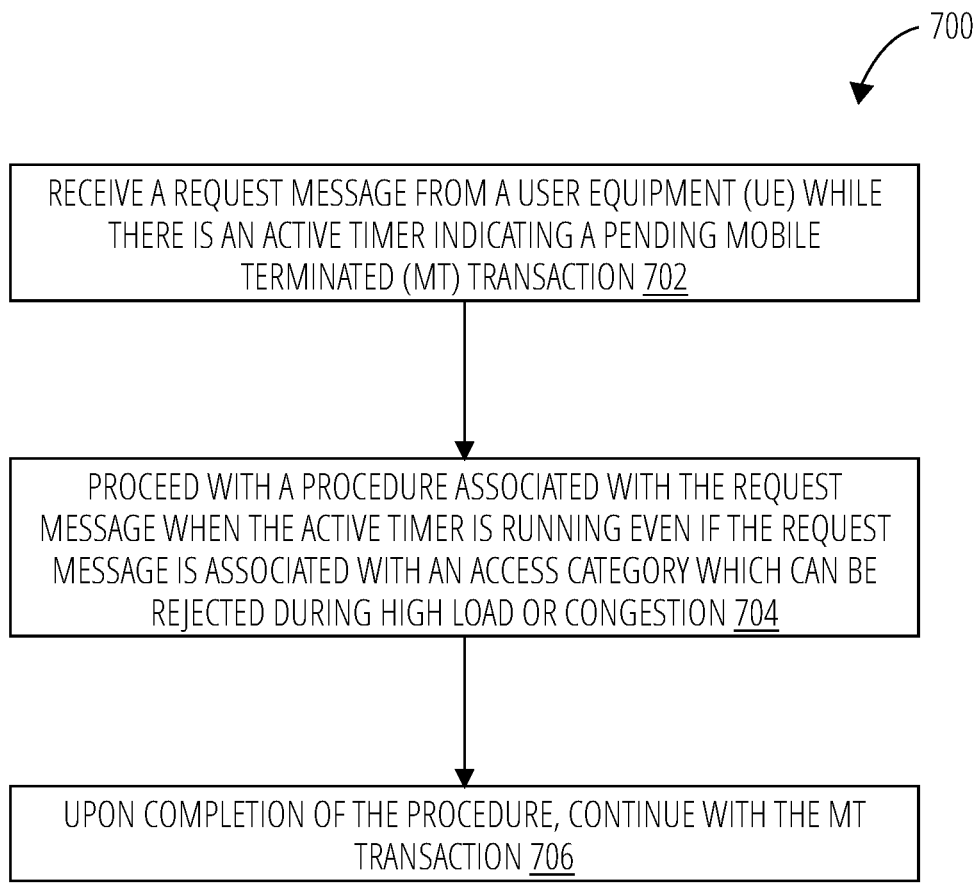
FIG. 7 illustrates a flow chart of a method for a network node to prevent missed notification and paging messages in accordance with one embodiment.

FIG. 7 illustrates a flow chart of a method 700 for a network node to prevent missed notification and paging messages. In block 702, method 700 receives a request message from a user equipment (UE) while there is an active timer indicating a pending Mobile Terminated (MT) transaction. In block 704, method 700 proceeds with a procedure associated with the request message when the active timer is running even if the request message is associated with an access category which can be rejected during high load or congestion. In block 706, method 700 upon completion of the procedure, continues with the MT transaction.

Figure 8:
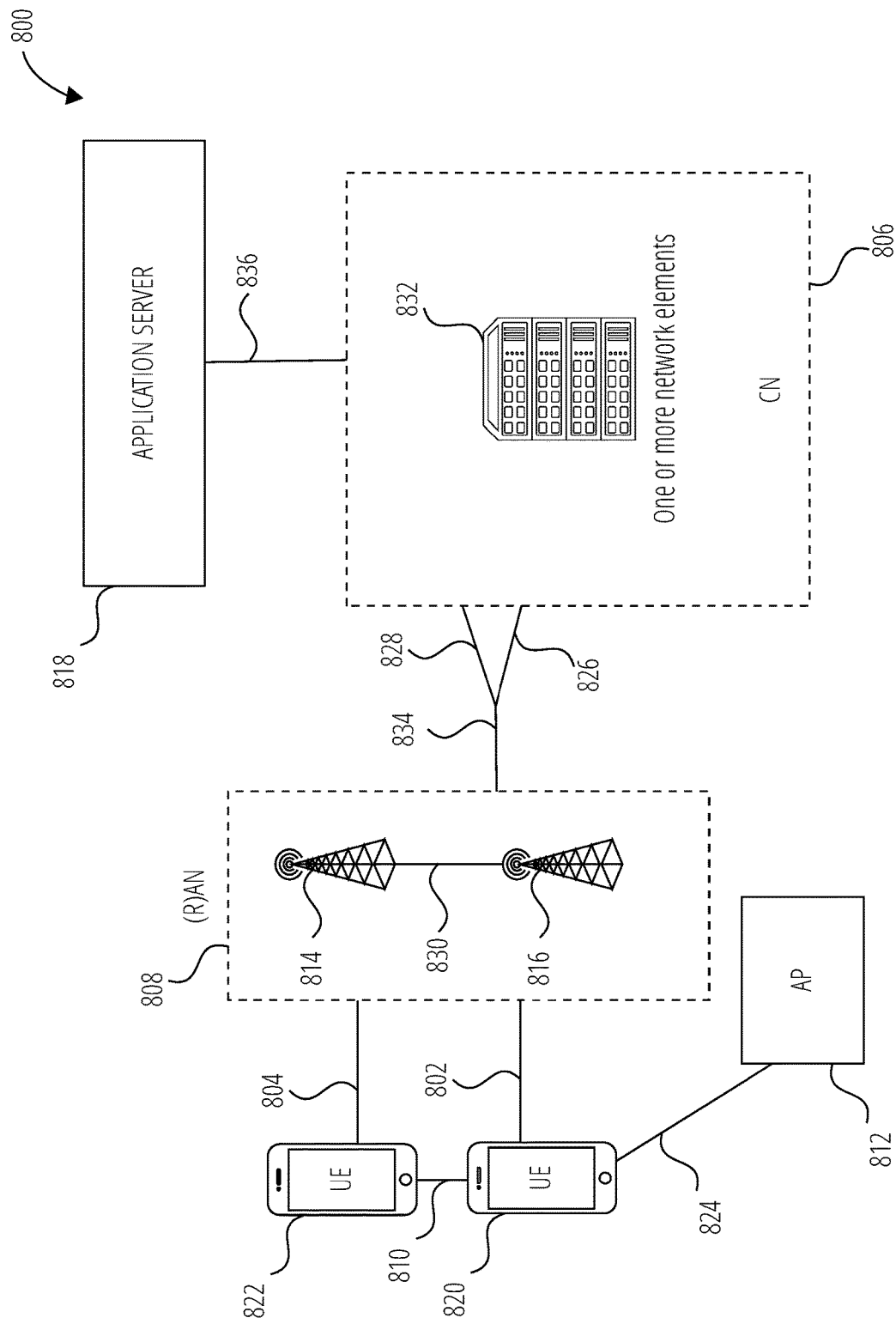
FIG. 8 illustrates a system in accordance with one embodiment.

FIG. 8 illustrates an example architecture of a system 800 of a network, in accordance with various embodiments. The following description is provided for an example system 800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 8, the system 800 includes UE 822 and UE 820. In this example, the UE 822 and the UE 820 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 822 and/or the UE 820 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 822 and UE 820 may be configured to connect, for example, communicatively couple, with an access node or radio access node (shown as (R)AN 808). In embodiments, the (R)AN 808 may be an NG RAN or a 5G RAN, an E-UTRAN, or a legacy RAN, such as a UTRAN or GERAN. As used herein, the term "NG RAN" or the like may refer to a (R)AN 808 that operates in an NR or 5G system, and the term "E-UTRAN" or the like may refer to a (R)AN 808 that operates in an LTE or 4G system. The UE 822 and UE 820 utilize connections (or channels) (shown as connection 804 and connection 802, respectively), each of which comprises a physical communications interface or layer (discussed in further detail below).

In this example, the connection 804 and connection 802 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 822 and UE 820 may directly exchange communication data via a ProSe interface 810. The ProSe interface 810 may alternatively be referred to as a sidelink (SL) interface 810 and may comprise one or more logical channels, including but not limited to a PSCCH, a PSSCH, a PSDCH, and a PSBCH.

The UE 820 is shown to be configured to access an AP 812 (also referred to as "WLAN node," "WLAN," "WLAN Termination," "WT" or the like) via connection 824. The connection 824 can comprise a local wireless connection, such as a connection consistent with any IEEE 802.11 protocol, wherein the AP 812 would comprise a wireless fidelity (Wi-Fi®) router. In this example, the AP 812 may be connected to the Internet without connecting to the core network of the wireless system (described in further detail below). In various embodiments, the UE 820, (R)AN 808, and AP 812 may be configured to utilize LWA operation and/or LWIP operation. The LWA operation may involve the UE 820 in RRC_CONNECTED being configured by the RAN node 814 or the RAN node 816 to utilize radio resources of LTE and WLAN. LWIP operation may involve the UE 820 using WLAN radio resources (e.g., connection 824) via IPsec protocol tunneling to authenticate and encrypt packets (e.g., IP packets) sent over the connection 824. IPsec tunneling may include encapsulating the entirety of original IP packets and adding a new packet header, thereby protecting the original header of the IP packets.

The (R)AN 808 can include one or more AN nodes, such as RAN node 814 and RAN node 816, that enable the connection 804 and connection 802. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 800 (e.g., an eNB). According to various embodiments, the RAN node 814 or RAN node 816 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 814 or RAN node 816 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 814 or RAN node 816); a MAC/PHY split wherein RRC, PDCP, RLC, and MAC layers are operated by the CRAN/vBBUP and the PHY layer is operated by individual RAN nodes (e.g., RAN node 814 or RAN node 816); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 814 or RAN node 816 to perform other virtualized applications. In some implementations, an individual RAN node may represent individual gNB-DUs that are connected to a gNB-CU via individual F1 interfaces (not shown by FIG. 8). In these implementations, the gNB-DUs may include one or more remote radio heads or RFEMs, and the gNB-CU may be operated by a server that is located in the (R)AN 808 (not shown) or by a server pool in a similar manner as the CRAN/vBBUP. Additionally, or alternatively, one or more of the RAN node 814 or RAN node 816 may be next generation eNBs (ng-eNBs), which are RAN nodes that provide E-UTRA user plane and control plane protocol terminations toward the UE 822 and UE 820, and are connected to an 5GC via an NG interface (discussed infra). In V2X scenarios one or more of the RAN node 814 or RAN node 816 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 814 and/or the RAN node 816 can terminate the air interface protocol and can be the first point of contact for the UE 822 and UE 820. In some embodiments, the RAN node 814 and/or the RAN node 816 can fulfill various logical functions for the (R)AN 808 including, but not limited to, radio network controller (RNC) functions such as radio bearer management, uplink and downlink dynamic radio resource management and data packet scheduling, and mobility management.

In embodiments, the UE 822 and UE 820 can be configured to communicate using OFDM communication signals with each other or with the RAN node 814 and/or the RAN node 816 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 814 and/or the RAN node 816 to the UE 822 and UE 820, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 822 and UE 820 and the RAN node 814 and/or the RAN node 816 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 822 and UE 820 and the RAN node 814 or RAN node 816 may operate using LAA, eLAA, and/or feLAA mechanisms. In these implementations, the UE 822 and UE 820 and the RAN node 814 or RAN node 816 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 822 and UE 820, RAN node 814 or RAN node 816, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 822, AP 812, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 822 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 822 and UE 820. The PDCCH carries information about the transport format and resource allocations related to the PDSCH channel, among other things. It may also inform the UE 822 and UE 820 about the transport format, resource allocation, and HARQ information related to the uplink shared channel. Typically, downlink scheduling (assigning control and shared channel resource blocks to the UE 820 within a cell) may be performed at any of the RAN node 814 or RAN node 816 based on channel quality information fed back from any of the UE 822 and UE 820. The downlink resource assignment information may be sent on the PDCCH used for (e.g., assigned to) each of the UE 822 and UE 820.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 814 or RAN node 816 may be configured to communicate with one another via interface 830. In embodiments where the system 800 is an LTE system (e.g., when CN 806 is an EPC), the interface 830 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 822 from an SeNB for user data; information of PDCP PDUs that were not delivered to a UE 822; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 800 is a 5G or NR system (e.g., when CN 806 is an 5GC), the interface 830 may be an Xn interface. The Xn interface is defined between two or more RAN nodes (e.g., two or more gNBs and the like) that connect to 5GC, between a RAN node 814 (e.g., a gNB) connecting to 5GC and an eNB, and/or between two eNBs connecting to 5GC (e.g., CN 806). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 822 in a connected mode (e.g., CM-CONNECTED) including functionality to manage the UE mobility for connected mode between one or more RAN node 814 or RAN node 816. The mobility support may include context transfer from an old (source) serving RAN node 814 to new (target) serving RAN node 816; and control of user plane tunnels between old (source) serving RAN node 814 to new (target) serving RAN node 816. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 808 is shown to be communicatively coupled to a core network—in this embodiment, CN 806. The CN 806 may comprise one or more network elements 832, which are configured to offer various data and telecommunications services to customers/subscribers (e.g., users of UE 822 and UE 820) who are connected to the CN 806 via the (R)AN 808. The components of the CN 806 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 806 may be referred to as a network slice, and a logical instantiation of a portion of the CN 806 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 818 may be an element offering applications that use IP bearer resources with the core network (e.g., UMTS PS domain, LTE PS data services, etc.). The application server 818 can also be configured to support one or more communication services (e.g., VoIP sessions, PTT sessions, group communication sessions, social networking services, etc.) for the UE 822 and UE 820 via the EPC. The application server 818 may communicate with the CN 806 through an IP communications interface 836.

In embodiments, the CN 806 may be an SGC, and the (R)AN 116 may be connected with the CN 806 via an NG interface 834. In embodiments, the NG interface 834 may be split into two parts, an NG user plane (NG-U) interface 826, which carries traffic data between the RAN node 814 or RAN node 816 and a UPF, and the S1 control plane (NG-C) interface 828, which is a signaling interface between the RAN node 814 or RAN node 816 and AMFs.

In embodiments, the CN 806 may be a 5G CN, while in other embodiments, the CN 806 may be an EPC). Where CN 806 is an EPC, the (R)AN 116 may be connected with the CN 806 via an S1 interface 834. In embodiments, the S1 interface 834 may be split into two parts, an S1 user plane (S1-U) interface 826, which carries traffic data between the RAN node 814 or RAN node 816 and the S-GW, and the S1-MME interface 828, which is a signaling interface between the RAN node 814 or RAN node 816 and MMEs.

Figure 9:
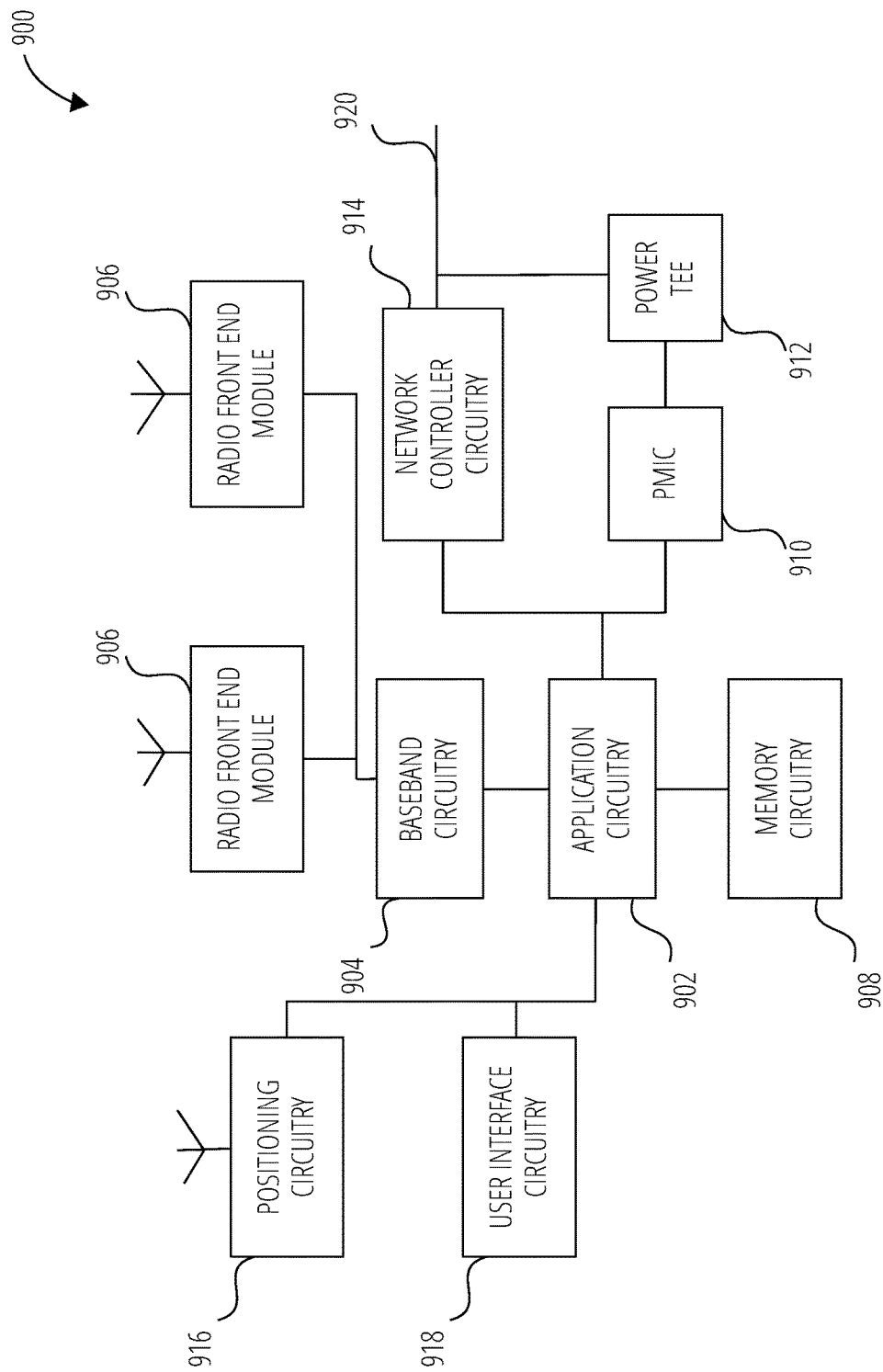
FIG. 9 illustrates an infrastructure equipment in accordance with one embodiment.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable devices (FPDs) such as field-programmable gate arrays (FPGAs) and the like; programmable logic devices (PLDs), such as complex PLDs (CPLDs), high-capacity PLDs (HCPLDs), and the like; ASICs, such as structured ASICs, and the like; programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 10:
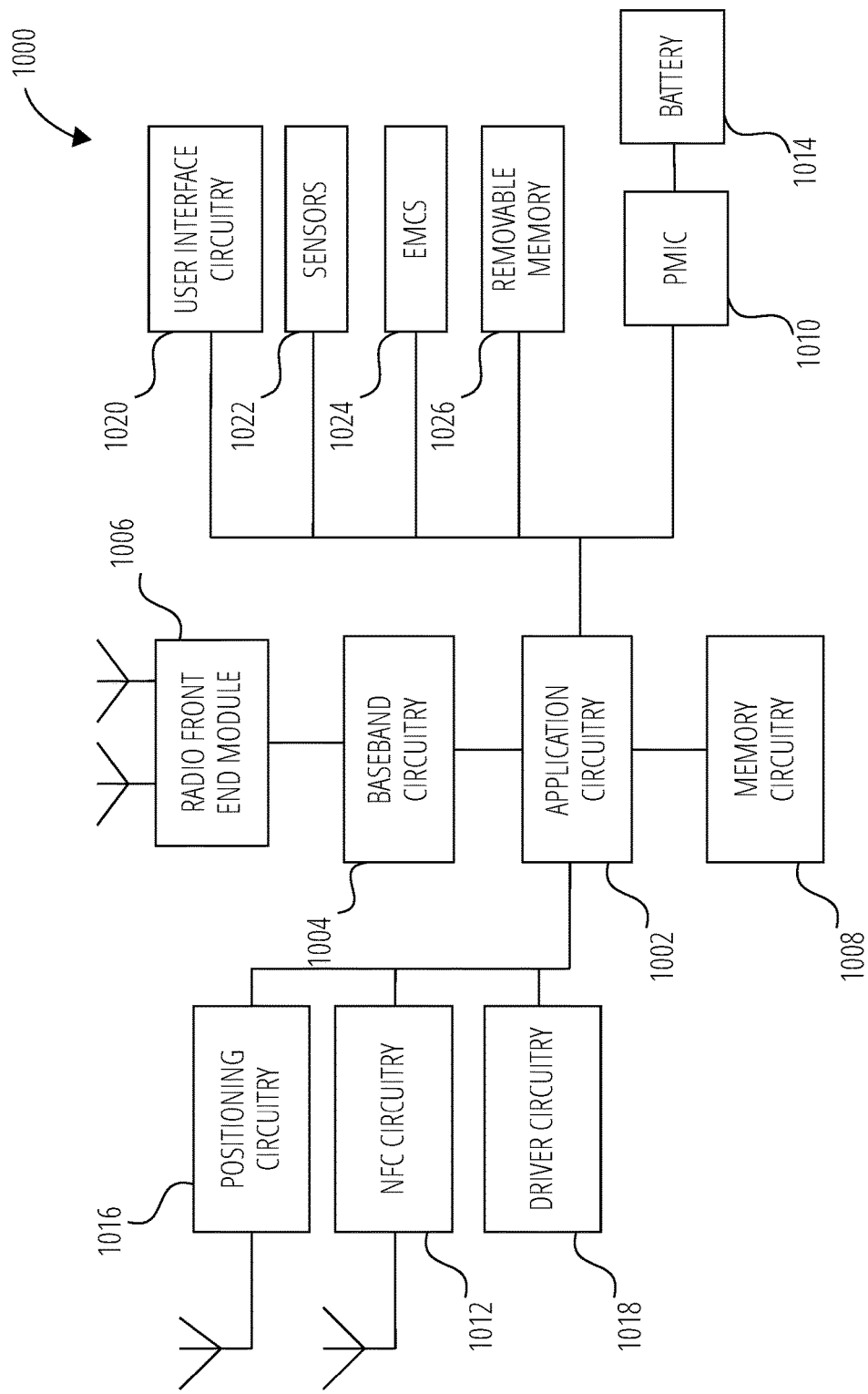
FIG. 10 illustrates a platform in accordance with one embodiment.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Core™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 may be on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1026 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1022 and electro-mechanical components (shown as EMCs 1024), as well as removable memory devices coupled to removable memory 1026.

The sensors 1022 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1024 include devices, modules, or subsystems whose purpose is to enable platform 1000 to change its state, position, and/or orientation, or move or control a mechanism or (sub)system. Additionally, EMCs 1024 may be configured to generate and send messages/signaling to other components of the platform 1000 to indicate a current state of the EMCs 1024. Examples of the EMCs 1024 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1024 based on one or more captured events and/or instructions or control signals received from a service provider and/or various clients. In some implementations, the interface circuitry may connect the platform 1000 with positioning circuitry 1016. The positioning circuitry 1016 includes circuitry to receive and decode signals transmitted/ broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-PNT IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1012). The NFC circuitry 1012 is configured to provide contactless, short-range communications based on radio frequency identification (RFID) standards, wherein magnetic field induction is used to enable communication between NFC circuitry 1012 and NFC-enabled devices external to the platform 1000 (e.g., an "NFC touchpoint"). NFC circuitry 1012 comprises an NFC controller coupled with an antenna element and a processor coupled with the NFC controller. The NFC controller may be a chip/IC providing NFC functionalities to the NFC circuitry 1012 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1012, or initiate data transfer between the NFC circuitry 1012 and another active NFC device (e.g., a smartphone or an NFC-enabled POS terminal) that is proximate to the platform 1000.

The driver circuitry 1018 may include software and hardware elements that operate to control particular devices that are embedded in the platform 1000, attached to the platform 1000, or otherwise communicatively coupled with the platform 1000. The driver circuitry 1018 may include individual drivers allowing other components of the platform 1000 to interact with or control various input/output (I/O) devices that may be present within, or connected to, the platform 1000. For example, driver circuitry 1018 may include a display driver to control and allow access to a display device, a touchscreen driver to control and allow access to a touchscreen interface of the platform 1000, sensor drivers to obtain sensor readings of sensors 1022 and control and allow access to sensors 1022, EMC drivers to obtain actuator positions of the EMCs 1024 and/or control and allow access to the EMCs 1024, a camera driver to control and allow access to an embedded image capture device, audio drivers to control and allow access to one or more audio devices.

The power management integrated circuitry (shown as PMIC 1010) (also referred to as "power management circuitry") may manage power provided to various components of the platform 1000. In particular, with respect to the baseband circuitry 1004, the PMIC 1010 may control power-source selection, voltage scaling, battery charging, or DC-to-DC conversion. The PMIC 1010 may often be included when the platform 1000 is capable of being powered by a battery 1014, for example, when the device is included in a UE.

In some embodiments, the PMIC 1010 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1014 may power the platform 1000, although in some examples the platform 1000 may be mounted deployed in a fixed location, and may have a power supply coupled to an electrical grid. The battery 1014 may be a lithium ion battery, a metal-air battery, such as a zinc-air battery, an aluminum-air battery, a lithium-air battery, and the like. In some implementations, such as in V2X applications, the battery 1014 may be a typical lead-acid automotive battery.

In some implementations, the battery 1014 may be a "smart battery," which includes or is coupled with a Battery Management System (BMS) or battery monitoring integrated circuitry. The BMS may be included in the platform 1000 to track the state of charge (SoCh) of the battery 1014. The BMS may be used to monitor other parameters of the battery 1014 to provide failure predictions, such as the state of health (SoH) and the state of function (SoF) of the battery 1014. The BMS may communicate the information of the battery 1014 to the application circuitry 1002 or other components of the platform 1000. The BMS may also include an analog-to-digital (ADC) convertor that allows the application circuitry 1002 to directly monitor the voltage of the battery 1014 or the current flow from the battery 1014. The battery parameters may be used to determine actions that the platform 1000 may perform, such as transmission frequency, network operation, sensing frequency, and the like.

A power block, or other power supply coupled to an electrical grid may be coupled with the BMS to charge the battery 1014. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1014, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1020 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1020 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1022 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
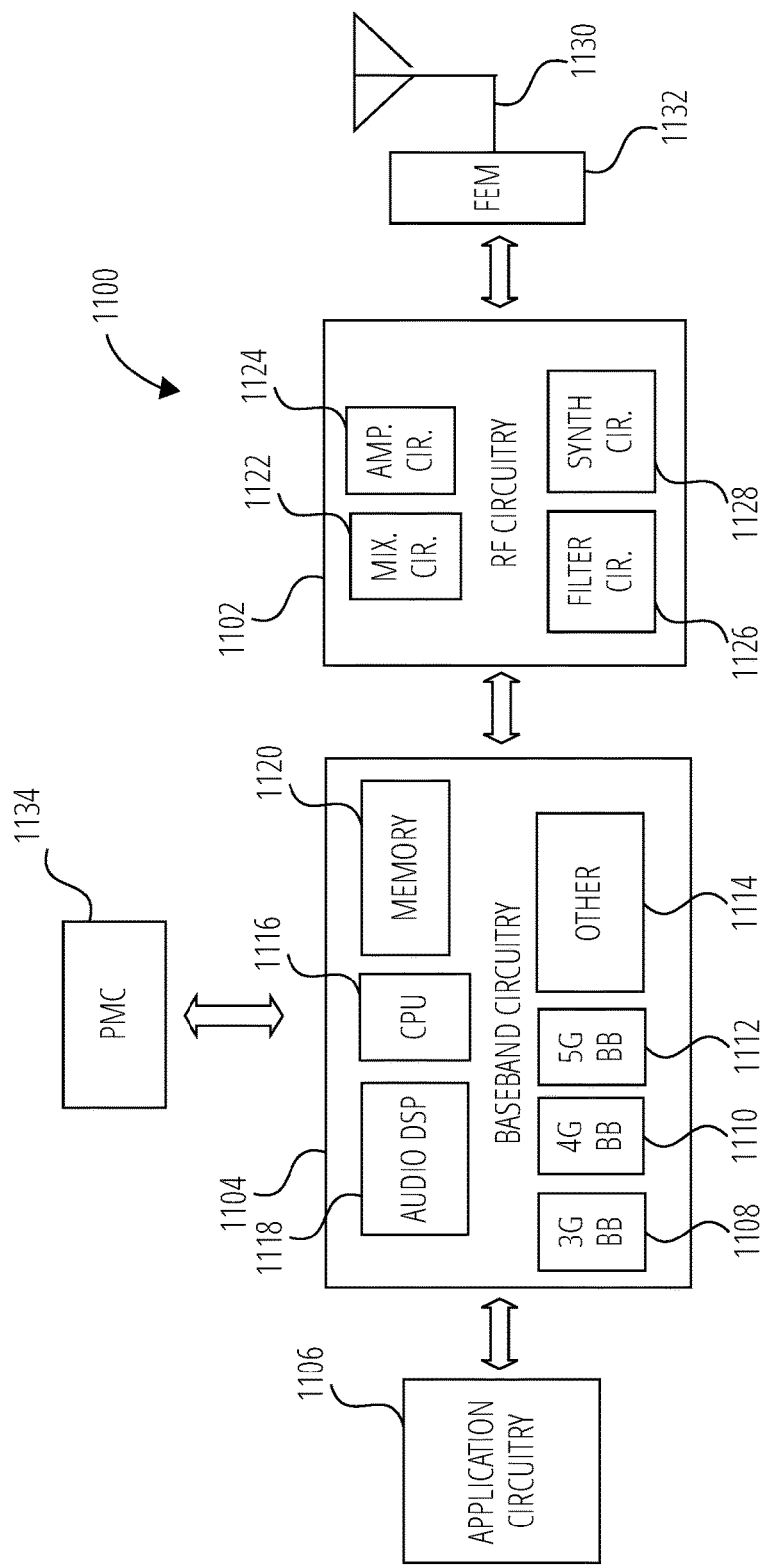
FIG. 11 illustrates a device in accordance with one embodiment.

FIG. 11 illustrates example components of a device 1100 in accordance with some embodiments. In some embodiments, the device 1100 may include application circuitry 1106, baseband circuitry 1104, Radio Frequency (RF) circuitry (shown as RF circuitry 1102), front-end module (FEM) circuitry (shown as FEM circuitry 1132), one or more antennas 1130, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1106, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1106 may include one or more application processors. For example, the application circuitry 1106 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1106 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1102 and to generate baseband signals for a transmit signal path of the RF circuitry 1102. The baseband circuitry 1104 may interface with the application circuitry 1106 for generation and processing of the baseband signals and for controlling operations of the RF circuitry 1102. For example, in some embodiments, the baseband circuitry 1104 may include a third generation (3G) baseband processor (3G baseband processor 1108), a fourth generation (4G) baseband processor (4G baseband processor 1110), a fifth generation (5G) baseband processor (5G baseband processor 1112), or other baseband processor(s) 1114 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1102. In other embodiments, some or all of the functionality of the illustrated baseband processors may be included in modules stored in the memory 1120 and executed via a Central Processing Unit (CPU 1116). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1118. The one or more audio DSP(s) 1118 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1106 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1102 may enable communication with wireless networks using modulated electromagnetic radiation through a non-solid medium. In various embodiments, the RF circuitry 1102 may include switches, filters, amplifiers, etc. to facilitate the communication with the wireless network. The RF circuitry 1102 may include a receive signal path which may include circuitry to down-convert RF signals received from the FEM circuitry 1132 and provide baseband signals to the baseband circuitry 1104. The RF circuitry 1102 may also include a transmit signal path which may include circuitry to up-convert baseband signals provided by the baseband circuitry 1104 and provide RF output signals to the FEM circuitry 1132 for transmission.

In some embodiments, the receive signal path of the RF circuitry 1102 may include mixer circuitry 1122, amplifier circuitry 1124 and filter circuitry 1126. In some embodiments, the transmit signal path of the RF circuitry 1102 may include filter circuitry 1126 and mixer circuitry 1122. The RF circuitry 1102 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1132 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1132. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1102 may include analog-to-digital converter (ADC) and digital-to-analog converter (DAC) circuitry and the baseband circuitry 1104 may include a digital baseband interface to communicate with the RF circuitry 1102.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1102 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1106 (such as an applications processor) depending on the desired output frequency. In some embodiments, a divider control input (e.g., N) may be determined from a look-up table based on a channel indicated by the application circuitry 1106.

Synthesizer circuitry 1128 of the RF circuitry 1102 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1102 may include an IQ/polar converter.

The FEM circuitry 1132 may include a receive signal path which may include circuitry configured to operate on RF signals received from one or more antennas 1130, amplify the received signals and provide the amplified versions of the received signals to the RF circuitry 1102 for further processing. The FEM circuitry 1132 may also include a transmit signal path which may include circuitry configured to amplify signals for transmission provided by the RF circuitry 1102 for transmission by one or more of the one or more antennas 1130. In various embodiments, the amplification through the transmit or receive signal paths may be done solely in the RF circuitry 1102, solely in the FEM circuitry 1132, or in both the RF circuitry 1102 and the FEM circuitry 1132.

In some embodiments, the FEM circuitry 1132 may include a TX/RX switch to switch between transmit mode and receive mode operation. The FEM circuitry 1132 may include a receive signal path and a transmit signal path. The receive signal path of the FEM circuitry 1132 may include an LNA to amplify received RF signals and provide the amplified received RF signals as an output (e.g., to the RF circuitry 1102). The transmit signal path of the FEM circuitry 1132 may include a power amplifier (PA) to amplify input RF signals (e.g., provided by the RF circuitry 1102), and one or more filters to generate RF signals for subsequent transmission (e.g., by one or more of the one or more antennas 1130).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1106, the RF circuitry 1102, or the FEM circuitry 1132.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1106 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1106 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
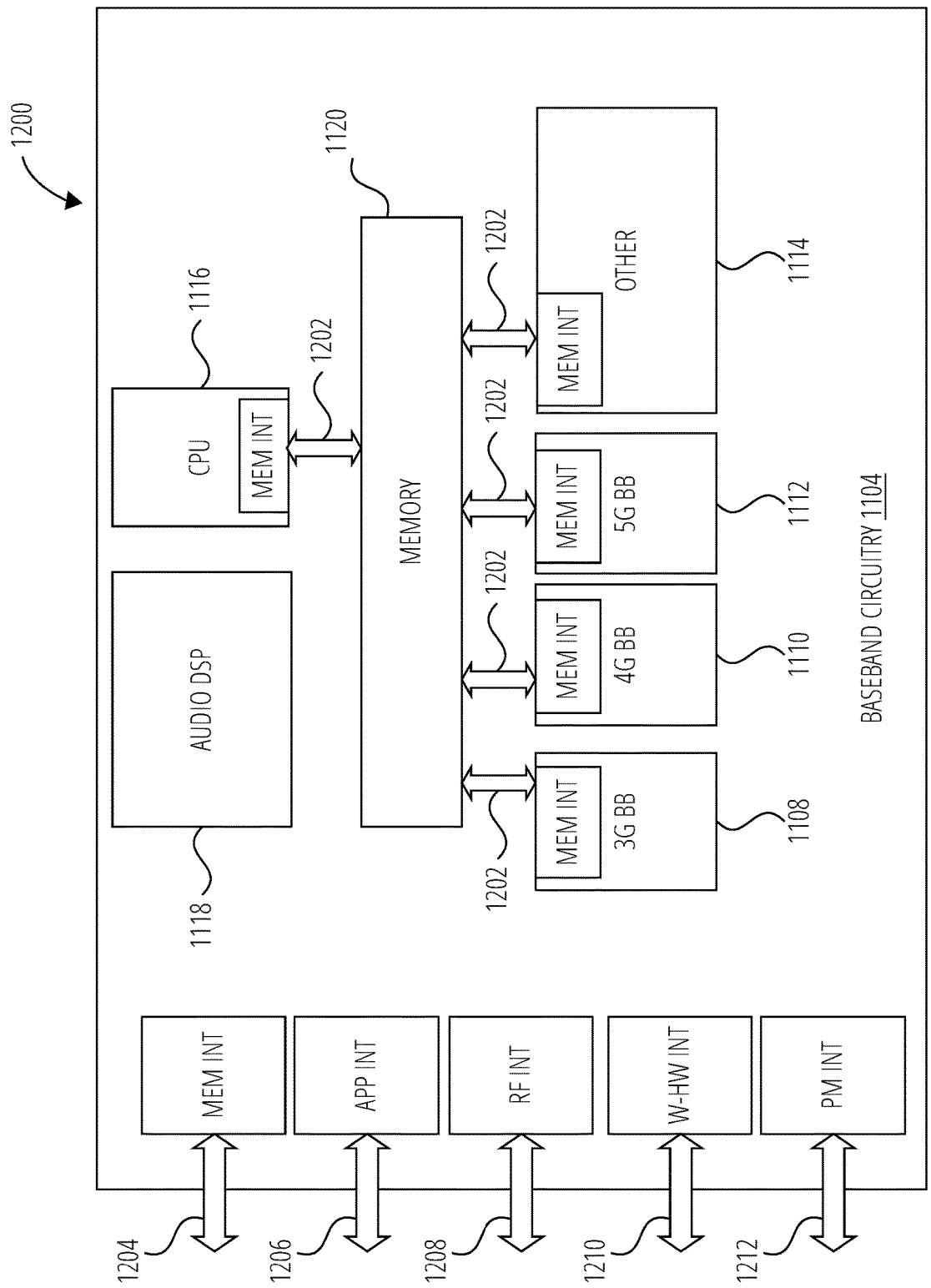
FIG. 12 illustrates example interfaces in accordance with one embodiment.

FIG. 12 illustrates example interfaces 1200 of baseband circuitry in accordance with some embodiments. As discussed above, the baseband circuitry 1104 of FIG. 11 may comprise 3G baseband processor 1108, 4G baseband processor 1110, 5G baseband processor 1112, other baseband processor(s) 1114, CPU 1116, and a memory 1120 utilized by said processors. As illustrated, each of the processors may include a respective memory interface 1202 to send/receive data to/from the memory 1120.

The baseband circuitry 1104 may further include one or more interfaces to communicatively couple to other circuitries/devices, such as a memory interface 1204 (e.g., an interface to send/receive data to/from memory external to the baseband circuitry 1104), an application circuitry interface 1206 (e.g., an interface to send/receive data to/from the application circuitry 1106 of FIG. 11), an RF circuitry interface 1208 (e.g., an interface to send/receive data to/from RF circuitry 1102 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1134.

Figure 13:
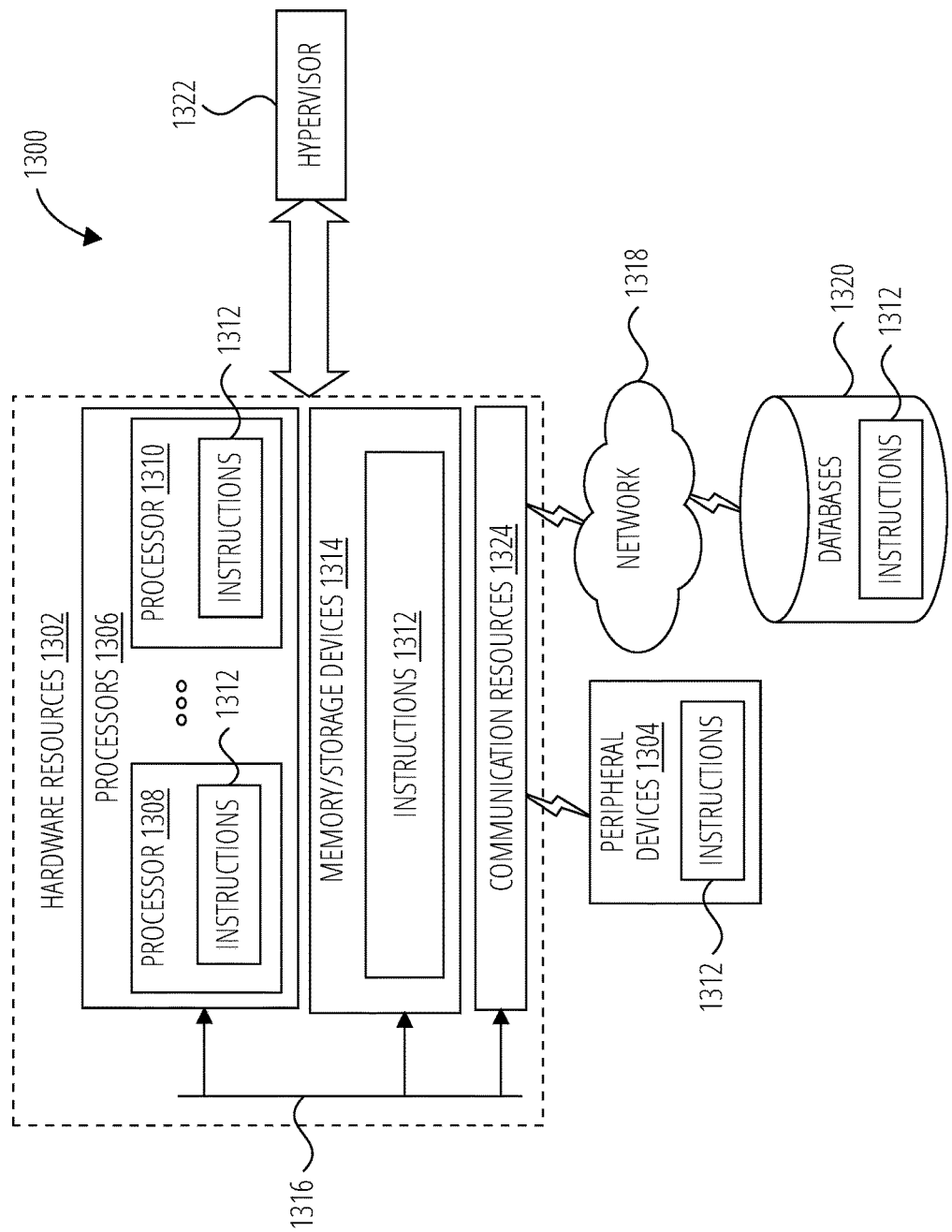
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1306 (or processor cores), one or more memory/storage devices 1314, and one or more communication resources 1324, each of which may be communicatively coupled via a bus 1316. For embodiments where node virtualization (e.g., NFV) is utilized, a hypervisor 1322 may be executed to provide an execution environment for one or more network slices/sub-slices to utilize the hardware resources 1302.

The processors 1306 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1308 and a processor 1310.

The memory/storage devices 1314 may include main memory, disk storage, or any suitable combination thereof. The memory/storage devices 1314 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1324 may include interconnection or network interface components or other suitable devices to communicate with one or more peripheral devices 1304 or one or more databases 1320 via a network 1318. For example, the communication resources 1324 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1312 may comprise software, a program, an application, an applet, an app, or other executable code for causing at least any of the processors 1306 to perform any one or more of the methodologies discussed herein. The instructions 1312 may reside, completely or partially, within at least one of the processors 1306 (e.g., within the processor's cache memory), the memory/storage devices 1314, or any suitable combination thereof. Furthermore, any portion of the instructions 1312 may be transferred to the hardware resources 1302 from any combination of the peripheral devices 1304 or the databases 1320. Accordingly, the memory of the processors 1306, the memory/storage devices 1314, the peripheral devices 1304, and the databases 1320 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1. A method for a user equipment (UE) comprising: initiating a first fifth generation mobility management (5GMM) specific procedure or service request procedure; receiving a message with access type set to third generation partnership project (3GPP) access when the first 5GMM specific procedure or service request procedure is ongoing; buffering the message until the first 5GMM specific procedure or service request procedure is concluded; and initiating a second 5GMM specific procedure or service request procedure with an access category that is not barred to handle the message if the first 5GMM specific procedure or service request procedure fails due to lower layers indicating that an access attempt is barred.

Example 2. The method of Example 1, wherein the access category of the second 5GMM specific procedure or service request procedure is an access category 0 (=Mobile Terminated (MT) access).

Example 3. The method of Example 1, further comprising ignoring the message if the first 5GMM specific procedure or service request is successful.

Example 4. The method of Example 1, wherein the first 5GMM specific procedure or service request procedure is barred if the lower layers indicate that access barring is applicable for all access categories except categories 0 and 2 and the first 5GMM specific procedure or service request procedure is set to a category other than 0 or 2.

Example 5. The method of Example 1, wherein the message comprises a paging message received with the access type set to 3GPP access.

Example 6. The method of Example 1, wherein the message comprises a notification message received via non-3GPP access with the access type indicating 3GPP access.

Example 7. The method of Example 1, further comprising proceeding with an MT transaction associated with the message if the first 5GMM specific procedure or service request procedure is successful.

Example 8. A user equipment (UE) comprising: a baseband processing unit; and a memory storing instructions that, when executed by the baseband processing unit, configure the UE to: initiate a first fifth generation mobility management (5GMM) specific procedure or service request procedure; receive a message with access type set to third generation partnership project (3GPP) access when the first 5GMM specific procedure or service request procedure is ongoing; buffer the received message until the first 5GMM specific procedure or service request procedure is concluded; and initiate a second 5GMM specific procedure or service request procedure with an access category that is not barred to handle the message if the first 5GMM specific procedure or service request procedure fails due to lower layers indication that an access attempt is barred.

Example 9. The UE of Example 8, wherein the access category of the second 5GMM specific procedure or service request procedure is category 0 (=Mobile Terminated (MT) access).

Example 10. The UE of Example 8, wherein the instructions further configure the UE to ignore the message if the first 5GMM specific procedure or service request is successful.

Example 11. The UE of Example 8, wherein the first 5GMM specific procedure or service request procedure is barred if the lower layers indicate that access barring is applicable for all access categories except categories 0 and 2 and the first 5GMM specific procedure or service request procedure is set to a category other than 0 or 2.

Example 12. The UE of Example 8, wherein the message comprises a paging message received with the access type set to 3GPP access.

Example 13. The UE of Example 8, wherein the message comprises a notification message received via non-3GPP access with the access type indicate 3GPP access.

Example 14. The UE of Example 8, wherein the instructions further configure the UE to proceed with an MT transaction associated with the received message if the first 5GMM specific procedure or service request procedure is successful.

Example 15. A method for a network node comprising: receiving a request message from a user equipment (UE) while there is an active timer indicating a pending Mobile Terminated (MT) transaction; proceeding with a procedure associated with the request message when the active timer is running; and upon completion of the procedure, continuing with the MT transaction.

Example 16. The method of Example 15, wherein the active timer begins when a paging procedure is initiated or a notification message has been transmitted to the UE.

Example 17. The method of Example 15, wherein the request message is a registration request.

Example 18. The method of Example 15, wherein the request message is a service request.

Example 19. The method of Example 18, wherein the request message is triggered with an access category which is not for MT access.

Example 20. The method of Example 15, further comprising continuing with the pending MT transaction after completion of a registration request or a service request.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) comprising:
   initiating a first fifth generation mobility management (5GMM) specific procedure or service request procedure;
   receiving a message with an access type set to a third generation partnership project (3GPP) access when the first 5GMM specific procedure or service request procedure is ongoing;
   buffering the message until the first 5GMM specific procedure or service request procedure is concluded; and
   initiating a second 5GMM specific procedure or service request procedure with an access category that is not barred to handle the message in response to the first 5GMM specific procedure or service request procedure failing due to one or more lower layers indicating that an access attempt is barred.

2. The method of claim 1, wherein the access category of the second 5GMM specific procedure or service request procedure is an access category 0 (=Mobile Terminated (MT) access).

3. The method of claim 1, further comprising ignoring the message in response to the first 5GMM specific procedure or service request being successful.

4. The method of claim 1, wherein the first 5GMM specific procedure or service request procedure is barred in response to the one or more lower layers indicating that access barring is applicable for all access categories except categories 0 and 2 and the first 5GMM specific procedure or service request procedure being set to a category other than 0 or 2.

5. The method of claim 1, wherein the message comprises a paging message received with the access type set to the 3GPP access.

6. The method of claim 1, wherein the message comprises a notification message received via a non-3GPP access with the access type indicating the 3GPP access.

7. The method of claim 1, further comprising proceeding with an MT transaction associated with the message in response to the first 5GMM specific procedure or service request procedure being successful.

8. A user equipment (UE) comprising:
   a baseband processing unit; and
   a memory storing instructions that, when executed by the baseband processing unit, configure the UE to:
      initiate a first fifth generation mobility management (5GMM) specific procedure or service request procedure;
      receive a message with an access type set to a third generation partnership project (3GPP) access when the first 5GMM specific procedure or service request procedure is ongoing;
      buffer the received message until the first 5GMM specific procedure or service request procedure is concluded; and
      initiate a second 5GMM specific procedure or service request procedure with an access category that is not barred to handle the message in response to the first 5GMM specific procedure or service request procedure failing due to a lower layers indication that an access attempt is barred.

9. The UE of claim 8, wherein the access category of the second 5GMM specific procedure or service request procedure is category 0 (=Mobile Terminated (MT) access).

10. The UE of claim 8, wherein the instructions further configure the UE to ignore the message in response to the first 5GMM specific procedure or service request being successful.

11. The UE of claim 8, wherein the first 5GMM specific procedure or service request procedure is barred in response to one or more lower layers indicating that access barring is applicable for all access categories except categories 0 and 2 and the first 5GMM specific procedure or service request procedure being set to a category other than 0 or 2.

12. The UE of claim 8, wherein the message comprises a paging message received with the access type set to the 3GPP access.

13. The UE of claim 8, wherein the message comprises a notification message received via a non-3GPP access with the access type indicate the 3GPP access.

14. The UE of claim 8, wherein the instructions further configure the UE to proceed with an MT transaction associated with the received message in response to the first 5GMM specific procedure or service request procedure being successful.

15. A non-transitory computer-readable storage medium, the computer-readable storage medium including instructions that when executed by a user equipment (UE), cause the UE to:
   initiate a first fifth generation mobility management (5GMM) specific procedure or service request procedure;
   receive a message with an access type set to a third generation partnership project (3GPP) access when the first 5GMM specific procedure or service request procedure is ongoing;
   buffer the message until the first 5GMM specific procedure or service request procedure is concluded; and
   initiate a second 5GMM specific procedure or service request procedure with an access category that is not barred to handle the message in response to the first 5GMM specific procedure or service request procedure failing due to one or more lower layers indicating that an access attempt is barred.

16. The computer-readable storage medium of claim 15, wherein the access category of the second 5GMM specific procedure or service request procedure is an access category 0 (=Mobile Terminated (MT) access).

17. The computer-readable storage medium of claim 15, wherein the instructions further configure the UE to ignore the message in response to the first 5GMM specific procedure or service request being successful.

18. The computer-readable storage medium of claim 15, wherein the first 5GMM specific procedure or service request procedure is barred in response to the one or more lower layers indicating that access barring is applicable for all access categories except categories 0 and 2 and the first 5GMM specific procedure or service request procedure being set to a category other than 0 or 2.

19. The computer-readable storage medium of claim 15, wherein the message comprises a paging message received with the access type set to the 3GPP access.

20. The computer-readable storage medium of claim 15, wherein the message comprises a notification message received via a non-3GPP access with the access type indicate the 3GPP access.

* * * * *